US006805579B2

(12) United States Patent
Marchand et al.

(10) Patent No.: US 6,805,579 B2
(45) Date of Patent: Oct. 19, 2004

(54) ELECTRICAL POWER CORD WITH MULTIPLE LOW-VOLTAGE TERMINAL

(75) Inventors: Gregory Marchand, Waukesha, WI (US); Philip Gull, West Allis, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 0 days.

(21) Appl. No.: 10/141,427

(22) Filed: May 7, 2002

(65) Prior Publication Data

US 2003/0211775 A1 Nov. 13, 2003

(51) Int. Cl.[7] .................................................. H02J 1/00
(52) U.S. Cl. ........................ 439/502; 307/75; 174/71 R
(58) Field of Search ................................ 439/502, 505; 307/75, 76; 174/71 R

(56) References Cited

U.S. PATENT DOCUMENTS

| | | | | |
|---|---|---|---|---|
| 2,444,458 A | * | 4/1948 | Master | |
| 2,952,829 A | | 9/1960 | Grohsgal | |
| 2,979,624 A | | 4/1961 | Askerneese | |
| 3,991,320 A | * | 11/1976 | Ross | |
| 4,740,167 A | | 4/1988 | Millhimes et al. | |
| 4,775,328 A | * | 10/1988 | McCarthy | 439/211 |
| 4,955,822 A | | 9/1990 | Look et al. | |
| 5,234,360 A | * | 8/1993 | Kramer, Jr. | |
| 5,243,136 A | * | 9/1993 | Chen | |
| 5,277,609 A | | 1/1994 | Ondrejka | |
| 5,439,390 A | | 8/1995 | Raynor et al. | |
| 5,547,399 A | * | 8/1996 | Naghi et al. | |
| 5,902,148 A | * | 5/1999 | O'Rourke | |
| 5,977,658 A | * | 11/1999 | Hoole | |
| 6,045,399 A | | 4/2000 | Yu | |
| 6,054,657 A | | 4/2000 | Liao | |
| 6,329,616 B1 | | 12/2001 | Lee | |
| 6,486,407 B1 | * | 11/2002 | Hawker et al. | 174/149 B |

FOREIGN PATENT DOCUMENTS

WO WO 99/40653 8/1999

OTHER PUBLICATIONS

Sears Catalog, 2002, p. 131.
Wire and Cable Guide from General Cable, Highland Heights, KY website www.generalcable.com, 2001.
Generac Portable Products Brochure, Dec. 2001.
Well Shin Enterprise Company LTD., CatalogSep. 1988, Part No. WS–002–2.

* cited by examiner

*Primary Examiner*—Renee Luebke
(74) *Attorney, Agent, or Firm*—Michael Best & Friedrich, LLP

(57) ABSTRACT

An electrical power cord for providing low-voltage alternating current outputs from a high-voltage alternating current source. The cord includes an input terminal that is operable to receive power from a high-voltage alternating current power source. The cord also includes first and second output terminals that are operable to output low-voltage alternating current. The input terminal includes two distinct neutral wires.

34 Claims, 3 Drawing Sheets

Fig. 4
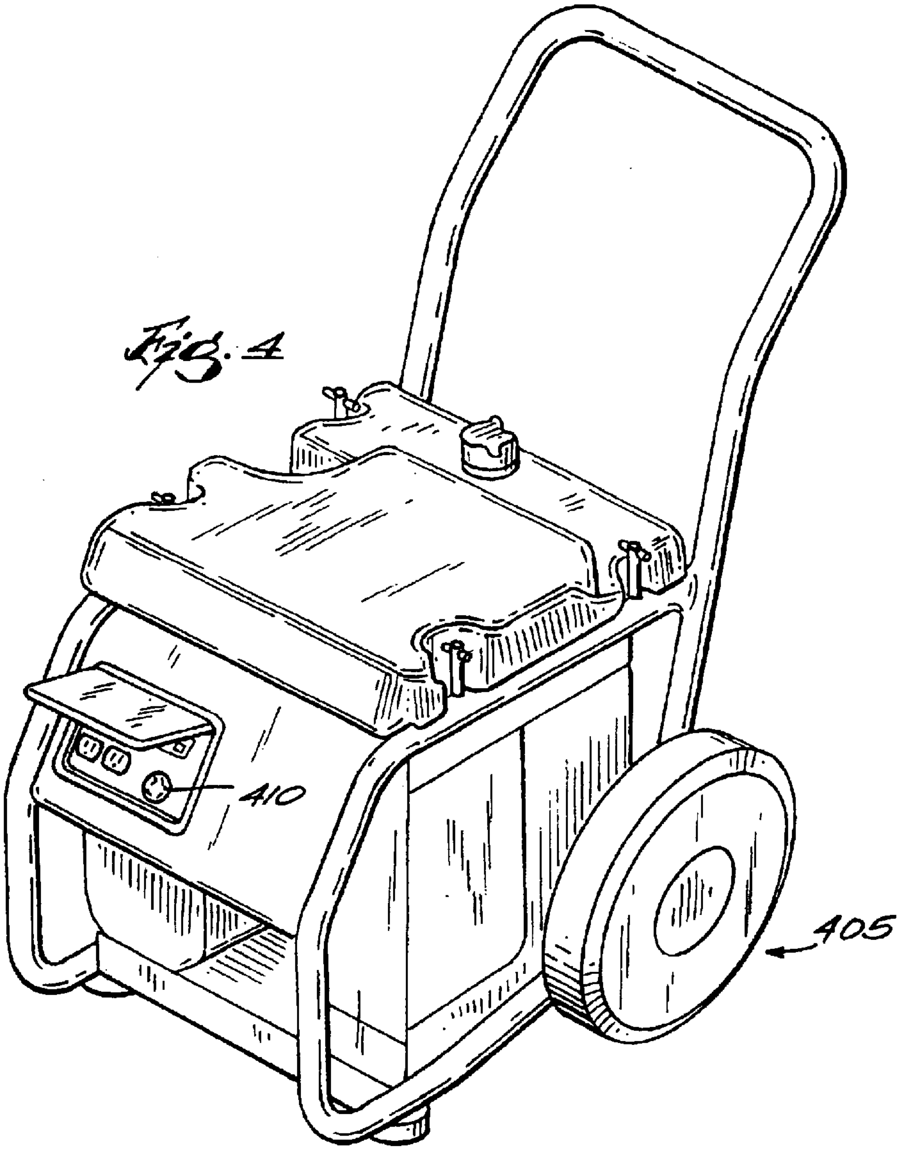
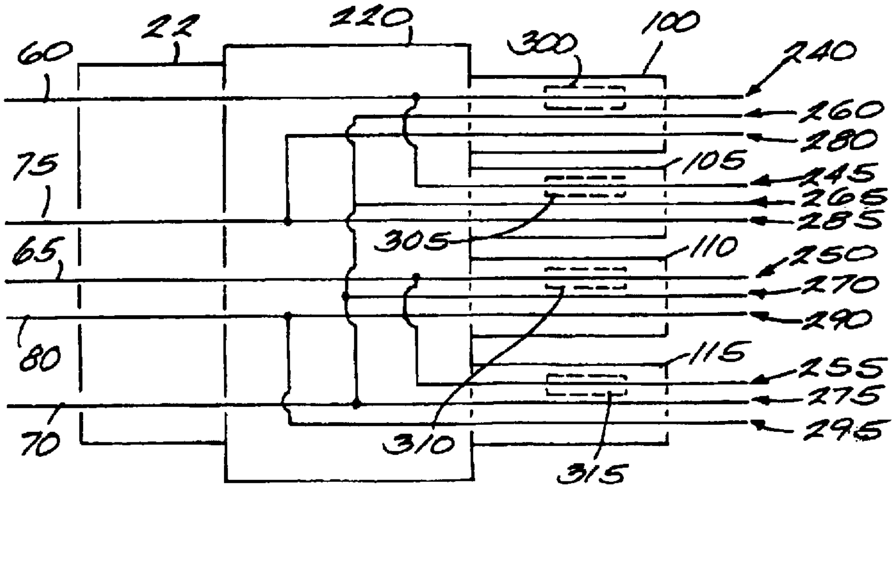
Fig. 2

ELECTRICAL POWER CORD WITH MULTIPLE LOW-VOLTAGE TERMINAL

BACKGROUND OF THE INVENTION

The present invention relates to electrical power cords, and more particularly, to electrical power cords having multiple outlets.

In the event of a power outage, a portable generator is often used to power certain appliances or electronics. However, using a portable generator often means that a user is only able to power a small number of appliances or circuits, due to the fact that portable generators typically only have a small number of outlets. Typically, large portable generators include a significant number of 120-volt outlets, but large generators are extremely heavy, hard to move, and expensive. Smaller, more economical generators are more appealing to users than larger generators, with the trade-off of having fewer outlets. A smaller generator may, for example, have two 120-volt outlets and one 240-volt, four-prong outlet.

In the event of a short-termed power outage, most users do not need to utilize the 240-volt outlet, but rather would like to use additional 120-volt outlets to run more appliances, such as a window-mounted air conditioner, a hair dryer, and a refrigerator, without having to purchase a large, portable generator.

SUMMARY OF THE INVENTION

In one embodiment, the invention provides an electrical power cord operable to output alternating current from a high-voltage (such as about 220 volts to about 250 volts) or low voltage (such as about 100 volts to about 125 volts) current source. The cord includes an input terminal, such as a four-prong male plug, that receives power from a high-voltage or low voltage power source. Two neutral wires are interconnected with a neutral prong of the input terminal. The cord also includes at least first and second output terminals, such as three-prong female plugs, operable to output low-voltage current, wherein each of the output terminals include a distinct neutral wire.

In another embodiment, the invention provides an electrical power cord that outputs low-voltage alternating current power. The power cord includes an input terminal, such as a four-prong male plug, that is operable to receive power from alternating current power source and to provide at least two current paths. In one embodiment, the input terminal may include two power wires, two neutral wires, and a ground wire. The power cord also includes at least first and second output terminals, such as a three-prong female plugs. Each output terminal outputs low-voltage current and provides a low-voltage current path. Each output terminal also includes a power wire, a neutral wire, and a ground wire. The power cord further includes a transition section, where one or more input current paths is split into a plurality of low-voltage current paths.

In the present invention, each input terminal has two distinct neutral wires, unlike prior art cords, which have a common neutral wire.

As is apparent from the above, it is an advantage of the invention to provide an electrical power cord operable to receive one or more inputs and to output multiple outputs. Other features and advantages of the invention will become apparent by consideration of the detailed description and accompanying drawings.

BRIEF DESCRIPTION OF THE DRAWINGS

In the drawings:

FIG. 2 is a schematic circuit diagram of the electrical power cord shown in FIG. 1.

FIG. 4. is a perspective view of a generator.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items.

Figure 1:
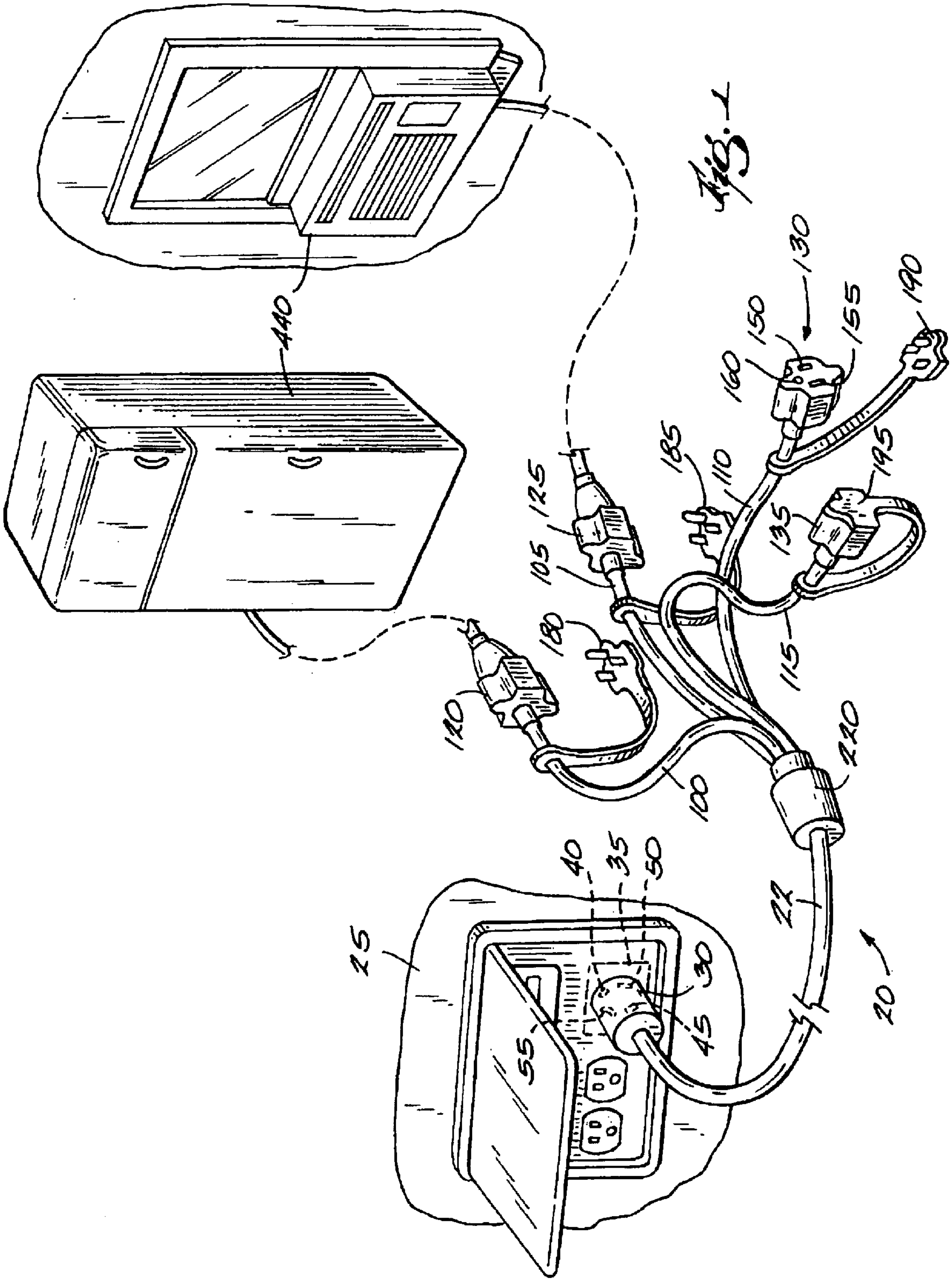
FIG. 1 is a perspective view of an electrical power cord in accordance with the invention.

FIGS. 1 and 2 illustrate an electrical power cord 20 operable to receive an alternating-current input from a source 25 and to output multiple low-voltage (100–125 volts) alternating-current outputs. The electrical power cord 20 includes a single input cord section 22 having an associated input terminal or male plug 30. The input plug 30 preferably plugs into a high-voltage output terminal or receptacle 35, such as a 250-volt output receptacle. In the embodiment shown, the input plug 30 is a National Electrical Manufacturers’ Association (“NEMA”) L14-20P 125/250-volt locking plug that is configured to be received by a NEMA L14-20R receptacle. In other embodiments, the input plug 30 is another NEMA plug or another plug configured to receive high or low voltage outputs. In further embodiments, the input plug 30 is also a two-wire, three-wire, or four-wire plug operable to be received by a corresponding straight blade receptacle.

Alternatively, the power cord according to this invention may include two or more input terminals, each input terminal being electrically connected to at least two output terminals, where each input terminal has two neutral wires electrically connected to a neutral prong of the input terminal. Each input terminal may receive high voltage or low voltage current.

In the embodiment shown in FIGS. 1 and 2, the input plug 30 includes four prongs 40, 45, 50, and 55, which are electrically connected to five wires associated with the input plug 30 and found within the input cord section 22. Prongs 40 and 45 connect to power or hot wires 60 and 65, respectively, and prong 55 connects to ground wire 70. Prong 50 connects to neutral wires 75 and 80. The wires 60, 65, 70, 75, and 80 and their configurations will be more fully discussed below.

The electrical power cord 20 also includes multiple low-voltage output cord sections with multiple corresponding low-voltage output terminals or female sockets. In the embodiment shown, the cord 20 includes four low-voltage output cord sections 100, 105, 110, and 115, each having an associated low-voltage output terminal or outlet 120, 125, 130, and 135, respectively. In other embodiments, the cord 20 includes more or fewer output cord sections and outlets than the embodiment illustrated in FIG. 1.

As shown in FIG. 1, the low-voltage outlets 120, 125, 130, and 135 are standard NEMA three-wire straight blade plugs. In other embodiments, the outlets 120, 125, 130, and 135 are two-wire, three-wire, or four-wire receptacles operable to dispense low-voltage outputs. In the embodiment shown, each low-voltage outlet 120, 125, 130, and 135 includes three blade receptacles or connectors, each receptacle being electrically connected to a different wire. For the purposes of explanation, only receptacles 150, 155, and 160 of the low-voltage outlet 130 are shown and discussed. Receptacle 150 connects to a power wire, receptacle 155 connects to a neutral wire, and receptacle 160 connects to a ground wire. The wires and their configurations will be more fully discussed below.

Also, the electrical power cord 20 preferably includes multiple protection plugs 180, 185, 190, and 195. Each protection plug 180, 185, 190, and 190 is mechanically connected near a low-voltage outlet 120, 125, 130, and 135, respectively. When inserted into an unused outlet, the protection plug obstructs the corresponding outlet and helps prevent an additional plug or similar item from being inserted into the outlet.

The electrical power cord 20 also includes a transition section 220. The single input cord section 22 transitions into the multiple output cord sections 100, 105, 110, and 115 at the transition section 220. FIG. 2 is a schematic circuit diagram of the electrical power cord 20 and illustrates how the transition section 220 splits the input cord section 22 into the multiple output cord sections 100, 105, 110, and 115. As shown in FIG. 2 and mentioned previously, the input cord section 22 includes the power wires 60 and 65, the ground wire 70, and the neutral wires 75 and 80. In the transition section 220, the first power wire 60 is split into two low-voltage power wires 240 and 245. The first low-voltage power wire 240 is included in output cord section 100, while the second low-voltage power wire 245 is included in output cord section 105. The second power wire 65 is also split into two low-voltage power wires 250 and 255 in the transition section 220. The low-voltage power wires 250 and 255 are included in the output cord sections 110 and 115, respectively. The ground wire 70 is split into four ground wires 260, 265, 270, and 275, which are included in the output cord sections 100, 105, 110, and 115, respectively. The first neutral wire 75 is split into two neutral wires 280 and 285, which are included in the output cord sections 100 and 105, respectively. The second neutral wire 80 is split into two neutral wires 290 and 295, which are included in the output cord sections 110 and 115, respectively.

Each of the input wires 60, 65, 70, 75, and 80, is potted in an insulating material, such that each input wire is electrically isolated from the other input wires. Also, each of the output wires 240–295 is potted in an insulating material, such that each output wire is electrically isolated from the other output wires. In other embodiments, the electrical power cord includes a separate fuse electrically connected to each input and output wire. Fuses would typically be used with cords rated for greater than a 20 Amp input current. As shown in FIG. 2, the hot wire 240 of output cord section 100 may include a fuse 300. Hot wires 245, 250, and 255 may also include fuses 305, 310, and 315, respectively. Fuses 300–315 are shown in dotted lines to illustrate that the embodiment in FIG. 2 may or may not include the fuses.

Figure 3:
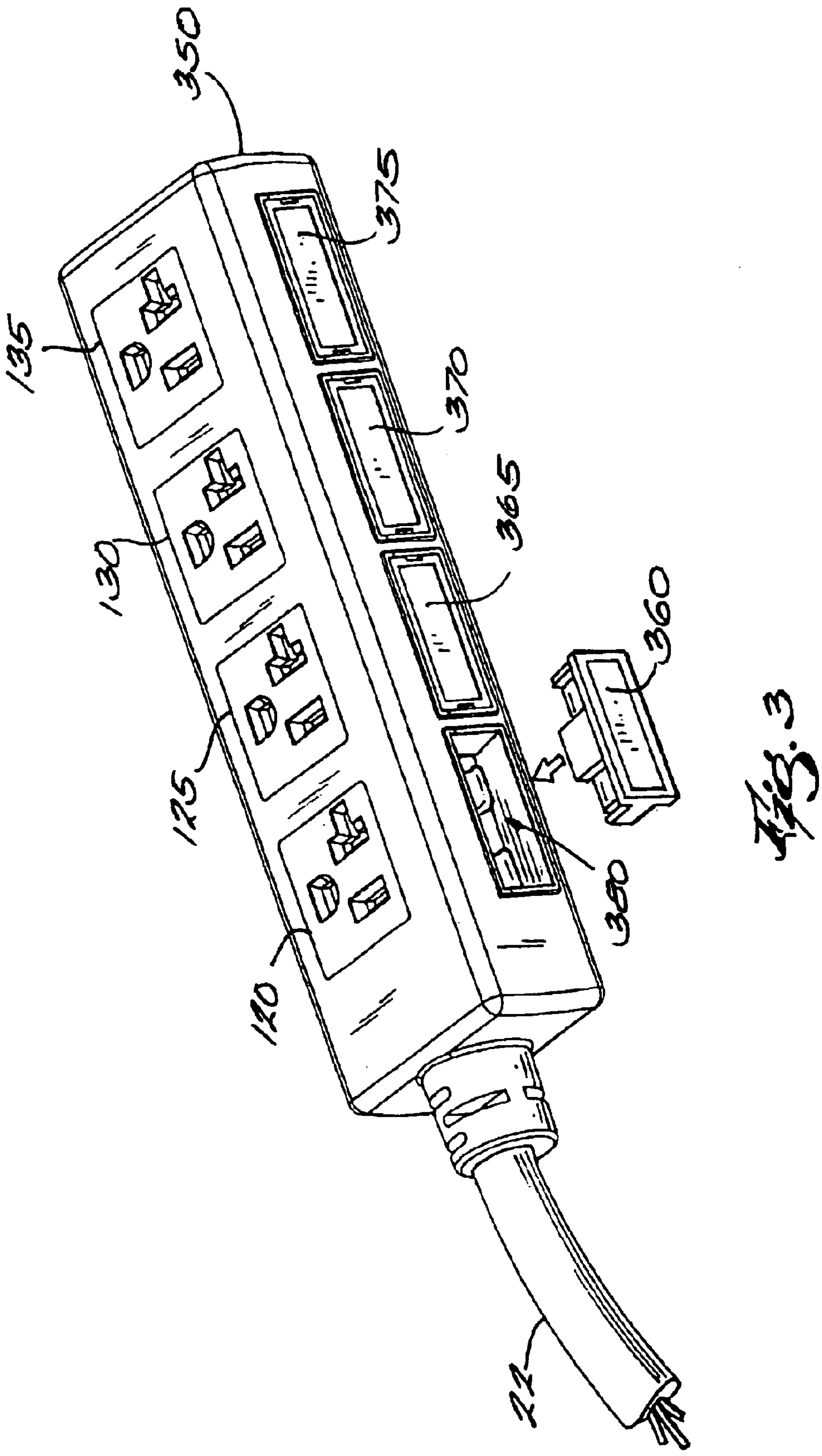
FIG. 3 is a partial perspective view of another embodiment of the electrical power cord in accordance with the invention.

In another embodiment shown in FIG. 3., the low-voltage outlets 120, 125, 130, and 135 are included in a single housing unit 350. In the embodiment shown, the housing unit 350 is substantially a rectangular prism, but in other embodiments, the housing unit varies in shape and size and includes more or fewer outlets. As shown in FIG. 3, each outlet 120, 125, 130, and 135 includes a fuse 360, 365, 370, and 375, respectively, that is connected to the respective hot wire of the outlet. The fuses 360–375, in one embodiment, are replaceable fuses that are removed from or inserted into a slot defined by the housing unit 350. As shown in FIG. 3, the fuse 360 is a replaceable fuse and is configured to be inserted into or removed from a slot 380. Circuit breakers could be used in place of the fuses.

In the event of a lack of sufficient utility line power, a user plugs the input plug 30 of the electrical power cord 20 into the receptacle 410 of a voltage source, such as a generator 405 illustrated in FIG. 4. The generator 405 produces an alternating-current output that is output from the receptacle 410 to the electrical power cord 20. Specifically, receptacle 410 may have two-120 volt outputs, which are typically combined by the load (appliance or circuit) to yield 240 volts.

Within the transition section 220 of the power cord 20, power wire 60, which is typically carrying approximately 100–125 volts, is split into two low-voltage (100–125 volt) power wires, 240 and 245. Also within the transition section 220, power wire 65, which is also typically carrying approximately 100–125 volts, is split into two low-voltage power wires 250 and 255. Each power wire 240, 245, 250, and 255 carries approximately 120 volts to the corresponding outlet 120, 125, 130, and 135. Thus, each low-voltage output outlet 120, 125, 130, and 135 outputs a low-voltage output, allowing a user to run a number of various appliances and electronics 440 (shown in FIG. 1). As shown in FIG. 1, a user can operate multiple low-voltage appliances 440 by a single high or low voltage receptacle 410 on the generator 405.

What is claimed is:

1. An electrical power cord that provides input current from a current source, the cord comprising:

an input plug operable to receive input current from the current source, the input plug having first and second prongs;

first and second neutral wires connected with said first prong of said input plug; and first and second output terminals operable to provide output current, wherein the first neutral wire is connected to the first output terminal and the second neutral wire is connected to the second output terminal.

2. The electrical power cord as set forth in claim 1, further comprising third and fourth output terminals operable to provide output current.

3. The electrical power cord as set forth in claim 2, wherein the first, second, third, and fourth output terminals each includes a ground wire.

4. The electrical power cord as set forth in claim 2, further comprising a fuse electrically connected to each output terminal.

5. The electrical power cord as set forth in claim 2, wherein each wire is potted in an insulating material such that each wire is electrically isolated from the other wires.

6. The electrical power cord as set forth in claim 2, further comprising:

first and second input power wires associated with the input plug, the first input power wire splitting into first and second output power wires, wherein the first output terminal is electrically connected to the first output power wire and the second output terminal is electrically connected to the second output power wire; and the second power wire splitting into third and fourth output power wires, wherein the third output terminal is electrically connected to the third output power wire and the fourth output terminal is electrically connected to the fourth output power wire.

7. The electrical power cord as set forth in claim 2, wherein each output terminal is a three-prong female socket having a power connector, a ground connector, and a neutral connector.

8. The electrical power cord as set forth in claim 1, wherein each of the output terminals further includes a ground wire.

9. The electrical power cord as set forth in claim 1, further comprising a fuse electrically connected to each output terminal.

10. The electrical power cord as set forth in claim 1, wherein each wire is potted in an insulating material such that each wire is electrically isolated from the other wires.

11. The electrical power cord as set forth in claim 1, wherein the input current has a voltage within a range of approximately 100 volts to approximately 250 volts.

12. The electrical power cord as set forth in claim 11, wherein the output current has a voltage within a range of approximately 100 volts to approximately 125 volts.

13. The electrical power cord as set forth in claim 1, further comprising:

a first input power wire electrically connected to the input plug, the first input power wire splitting into first and second output power wires, and wherein the first output terminal is electrically connected to the first output power wire and the second output terminal is electrically connected to the second output power wire.

14. The electrical power cord as set forth in claim 1, wherein the current source is an electrical generator.

15. The electrical power cord as set forth in claim 1, wherein the input plug is a four-prong male plug having two power prongs, a ground prong, and a neutral prong, and wherein the first and second neutral wires are electrically connected to the neutral prong.

16. The electrical power cord as set forth in claim 1, wherein each output terminal is a three-prong female socket having a power connector, a ground connector, and a neutral connector, and wherein at least one of the first and second neutral wires is electrically connected to each neutral connector.

17. The electrical power cord as set forth in claim 1, wherein the first and second output terminals are included in a single housing unit.

18. An electrical power cord operable to receive power from a power source and to output power, the cord comprising:

an input cord connected to an input plug operable to receive power from the power source and to provide at least one current path, the input plug having first and second prongs, and the input cord including a first input power wire, a second input power wire, a first input neutral wire connected to said first prong, a second input neutral wire connected to said first prong, and a ground wire;

a first output cord connected to a first output terminal operable to output power and providing a first output current path, the first output cord and the first output terminal including a first output power wire, a first output neutral wire electrically connected to the first input neutral wire, and a first output ground wire;

a second output cord connected to a second output terminal operable to output power and providing a second output current path, the second output cord and the second output terminal including a second output power wire, a second output neutral wire electrically connected to the second input neutral wire, and a second output ground wire; and a transition section disposed between the input cord on the one hand and the first and second output cords on the other hand, where said at least one current path is split into said first and second current paths.

19. The electrical power cord as set forth in claim 18, further comprising third and fourth output cords connected to respective output terminals each operable to output power and providing respective third and fourth current paths, each output cord and each output terminal including a power wire, an output neutral wire, and a ground wire.

20. The electrical power cord as set forth in claim 19, further comprising a fuse electrically connected to each output terminal.

21. The electrical power cord as set forth in claim 19, wherein each wire in each output terminal is potted in insulating material such that each wire is electrically isolated from the other wires in the same output terminal.

22. The electrical power cord as set forth in claim 19, wherein the second input power wire is split into third and fourth output power wires, wherein the third output power wire is electrically connected to the third output terminal, and wherein the fourth output power wire is electrically connected to the fourth output terminal.

23. The electrical power cord as set forth in claim 19, wherein each output terminal includes a three-prong female socket having a power connector, a ground connector, and a neutral connector, and wherein at least one of the input neutral wires is electrically connected to each neutral connector.

24. The electrical power cord as set forth in claim 18, further comprising a fuse electrically connected to each output terminal.

25. The electrical power cord as set forth in claim 18, wherein the received power has a voltage within a range of approximately 100 volts to approximately 250 volts.

26. The electrical power cord as set forth in claim 25, wherein the output power has a voltage within a range of approximately 100 volts to approximately 125 volts.

27. The electrical power cord as set forth in claim 18, wherein each wire in each output terminal is potted in insulating material such that each wire is electrically isolated from the other wires in the same output terminal.

28. The electrical power cord as set forth in claim 18, wherein the first input power wire is split into first and second output power wires, wherein the first output power wire is electrically connected to the first output terminal, and wherein the second output power wire is electrically connected to the second output terminal.

29. The electrical power cord as set forth in claim 18, wherein the current source is an electrical generator.

30. The electrical power cord as set forth in claim 18, wherein the input terminal includes a four-prong male plug having two power prongs, a ground prong, and a neutral prong, and wherein the two input neutral wires are electrically connected to the neutral prong.

31. The electrical power cord as set forth in claim 18, wherein each output terminal includes a three-prong female socket having a power connector, a ground connector, and a neutral connector.

32. An electrical power cord comprising:

an input cord including a first neutral wire and a second neutral wire and having a first distal end;

an input terminal connected to the first distal end of the input cord, the input terminal having at least one prong, the prong connected to the first neutral wire and the second neutral wire;

a first output terminal connected to the first neutral wire; and a second output terminal connected to the second neutral wire.

33. The electrical power cord as set forth in claim 32, wherein the input cord further includes a second distal end and the electrical power cord further comprises:

a housing connected to the second distal end of the input power cord, the first output terminal and the second output terminal are included in the housing.

34. The electrical power cord as set forth in claim 32, wherein the input cord further includes a second distal end and the electrical power cord further comprises:

a transition section connected to the second distal end on the input cord;

a first output cord having a first distal end and a second distal end, the first distal end connected to the transition section and the second distal end connected to the first output terminal, the first output cord including the first neutral wire; and a second output cord having a first distal end and a second distal end, the first distal end connected to the transition section and the second distal end connected to the second output terminal, the second output cord including the second neutral wire.

* * * * *